F. E. AURAND.
PERCOLATOR.
APPLICATION FILED MAY 10, 1912.
1,054,486.
Patented Feb. 25, 1913.
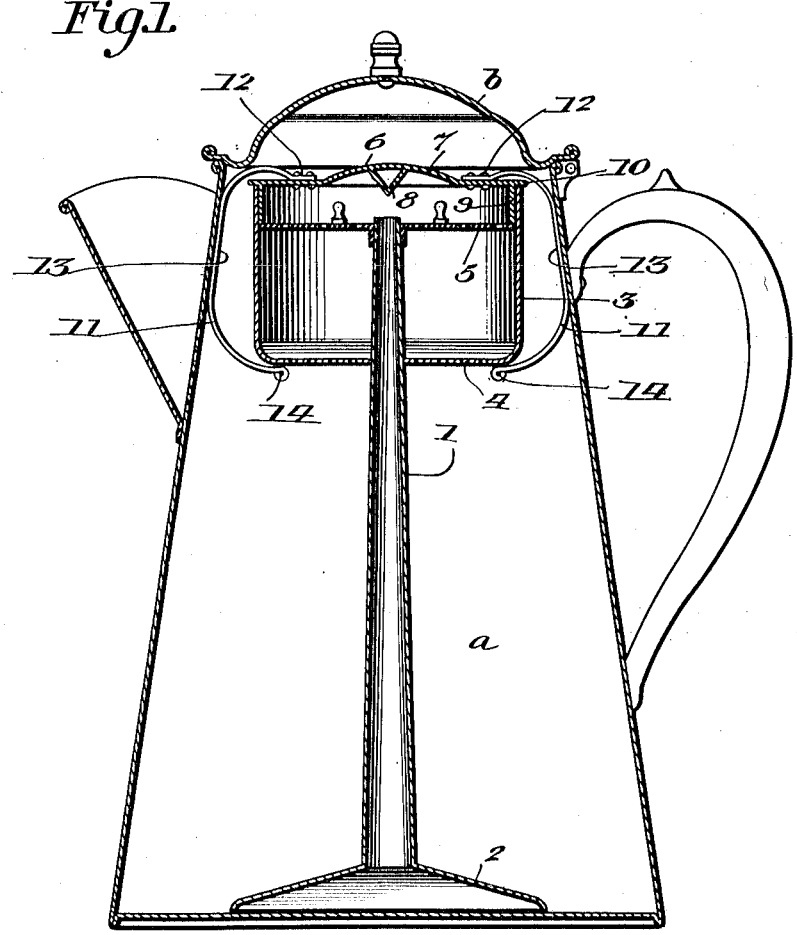
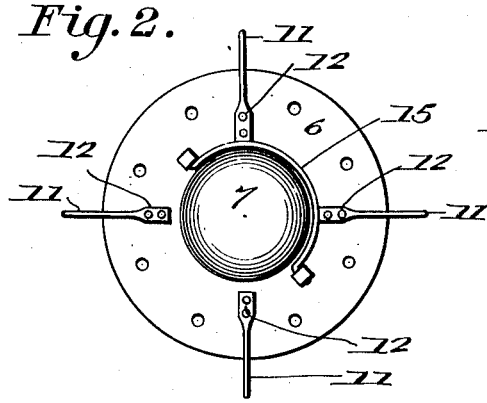
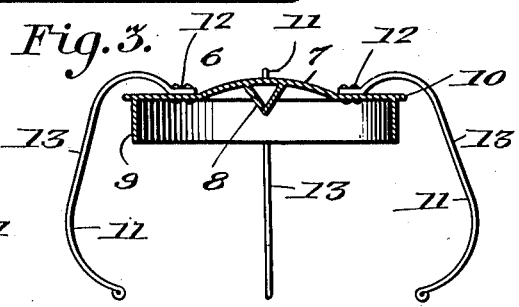
Inventor
F. E. Aurand
Witnesses
Philip E. Barnes
J. W. Garner
By Victor J. Evans
Attorney

UNITED STATES PATENT OFFICE.

FRANK EDWARD AURAND, OF CHICAGO, ILLINOIS.

PERCOLATOR.

1,054,486.     Specification of Letters Patent.     Patented Feb. 25, 1913.

Application filed May 10, 1912. Serial No. 696,477.

*To all whom it may concern:*

Be it known that I, FRANK E. AURAND, a citizen of the United States, residing at Chicago, in the county of Cook and State of Illinois, have invented new and useful Improvements in Percolators, of which the following is a specification.

This invention is an improved percolator adapted for use in an ordinary coffee pot and consists in the construction, combination and arrangement of devices hereinafter described and claimed.

The object of my invention is to provide an improved percolator which is extremely cheap and simple and which is adapted to be used in any ordinary coffee pot and which does not require to be removed from the pot before pouring the coffee.

In the drawings:—Figure 1 is a vertical central sectional view of my improved percolator, showing the same arranged in an ordinary coffee pot for use in connection therewith. Fig. 2 is a detail plan of the cover for the percolating cup. Fig. 3 is a detail transverse sectional view of the same.

In accordance with my invention, I provide an upwardly tapering tube 1 which is provided at its lower larger end with a hollow foot or base 2 which is open on its under side. This tube with its hollow base is adapted to be placed in any ordinary coffee pot so as to cause the hollow base to rest on the center of the bottom of the pot.

In connection with the percolator tube, I provide a percolating cup 3 which has a central opening in its bottom through which the upper portion of the tube extends. The bottom of this percolating cup is provided with perforations 4 of suitable size. On the upper end of the tube is secured the central portion of a perforated disk 5 which is removable from the spout and when attached to the upper end of the tube is arranged in the upper portion of the cup.
The cup is provided with a detachable cover 6, the central portion of which is crowned as at 7 and is provided on its under side with a spreader or deflector 8. This cover has a depending annular flange 9 which is adapted to fit in the upper end of the cup and has a flange 10 to bear on the upper edge of the cup. When the cover is in place in the cup, its flange 9 bears on the upper side of the perforated disk 5 and holds the latter in place on the upper end of the tube. The cover is provided with a series of radially and vertically arranged spring clamping arms 11, the upper end of each of which is radial with respect to and is secured on the cover as at 12. These spring clamping arms diverge downwardly and present straight portions 13 to bear against the inner side of the coffee pot near the upper end of the latter, the lower ends of the said spring clamping arms being inturned and extending under the bottom of the cup, as at 14. These spring clamping arms by projecting radially from the percolator and bearing against the inner side of the upper portion of the coffee pot serve to position the percolator in the center of the coffee pot and owing to the downwardly inclined arrangement of the said spring clamping arms and the inclined sides of the coffee pot, the said arms also serve to exert downward pressure or tension on the percolator so as to normally keep the lower edge of the hollow foot 2 in contact with the bottom of the coffee pot. The cover 6 has a pivotally mounted bail 15 which is adapted to be turned downwardly on the cover and also to be raised therefrom, this bail serving to enable the cover, together with the other parts of the percolator to be readily removed from the coffee pot, when desired. The coffee pot is indicated at *a* in Fig. 1 and its cover at *b*.

My improved percolator may be used in connection with any ordinary form of coffee pot and does not require to be removed therefrom before pouring the coffee.

The operation of my percolator is as follows:—The percolator is arranged in the center of the coffee pot with its foot 2 bearing on the bottom thereof, a suitable quantity of coffee is placed in the cup, the perforated disk is placed on the upper end of the upwardly tapered tube and the cover 6 is then placed on the cup, the spring clamping arms 11 of the cover acting as hereinbefore stated to hold the percolator in place in the center of the pot and to also press downwardly thereon. The water in the pot when raised to the boiling point is forced upwardly from time to time by steam pressure through the tapered tube, the spring clamping arms 13 yielding under the steam pressure to permit water to enter the tube through the hollow foot 2 thereof, and as the water gushes upwardly from the upper end of the tube, it strikes and is deflected by the deflector 8 and falls in drops on the perforated disk and seethes down through the coffee in the cup, thereby extracting the essence of the coffee, the same dropping into the water in the bottom of the pot. While the springs 13 yield to some extent to the steam pressure in the coffee pot yet they hold the percolator in place thereon. It will be noted that after the coffee is made, it is not necessary to remove the percolator before pouring the coffee as the percolator keeps its place in the pot, owing to the action of the spring clamping arms.

The various parts of my improved percolator may be made of any suitable material or materials and it will be understood that the same may be produced at small cost.

While I have herein shown and described a preferred form of my invention, I would have it understood that changes may be made in the form, proportion and construction of the several parts without departing from the spirit of my invention and within the scope of the appended claims.

I claim:—

1. A percolating attachment for a coffee pot comprising a percolator tube, a cup on the upper end of the tube into which the latter discharges, a cover on the cup and radially and vertically arranged springs having their upper ends connected to the cover, the said springs extending downwardly and outwardly from the cup and adapted to engage the inner side of a coffee pot to hold the percolator in place therein.

2. A percolating attachment for a coffee pot comprising a percolator tube, a cup on the upper end of the tube into which the latter discharges, a cover on the cup and radially and vertically arranged springs having their upper ends connected to the cover; the said springs extending downwardly and outwardly from the cup and adapted to engage the inner side of a coffee pot to hold the percolator in place therein, and the lower ends of the springs being bent under the bottom of the cup to hold the cover thereof in place.

In testimony whereof I affix my signature in presence of two witnesses.

FRANK EDWARD AURAND.

Witnesses:
EDWIN JEWETT,
W. T. WARDELL.